United States Patent [19]

Yurugi et al.

[11] 3,880,850

[45] Apr. 29, 1975

[54] PYRIMIDO(4,5-D)PYRIDAZINE DERIVATIVES AND PROCESS FOR PRODUCING THEM

[75] Inventors: Shojiro Yurugi, Kyoto; Shintaro Kikuchi, Hyogo, both of Japan

[73] Assignee: Takeda Chemical Industries, Ltd., Osaka, Japan

[22] Filed: Dec. 6, 1972

[21] Appl. No.: 312,504

[30] Foreign Application Priority Data

Dec. 6, 1971 Japan .......................... 46-98876

[52] U.S. Cl. ....... 260/246 B; 260/256.4 F; 424/248

[51] Int. Cl. .......................................... C07d 87/40

[58] Field of Search .................. 260/256.4 F, 246 B

*Primary Examiner*—Donald G. Daus

*Assistant Examiner*—Jose Tovar

*Attorney, Agent, or Firm*—Wenderoth, Lind & Ponack

[57] ABSTRACT

Novel compounds of the formula

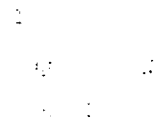

(wherein $R^1$ is phenyl which may be substituted by lower alkyl, $R^2$ is a 5- or 6-membered heterocyclic imino group which may be substituted by a pyridyl group or lower alkoxy, cycloalkyl, phenyl which may be substituted by lower alkyl or lower alkoxy, or aralkyl whose aryl moiety may be substituted by lower alkyl, lower alkoxy or halogen) and their pharmaceutically acceptable acid salts, which are useful as diuretics, and a process for producing them.

27 Claims, No Drawings

PYRIMIDO(4,5-D)PYRIDAZINE DERIVATIVES AND PROCESS FOR PRODUCING THEM

This invention relates to novel compounds of the formula (wherein $R^1$ is phenyl which may be substituted by lower alkyl, $R^2$ is a 5- or 6-membered heterocyclic imino group which may be substituted by lower alkyl and $R^3$ is alkyl which may be substituted by a pyridyl group or lower alkoxy, cycloalkyl, phenyl which may be substituted by lower alkyl or lower alkoxy, or aralkyl whose aryl moiety may be substituted by lower alkyl, lower alkoxy or halogen) and their pharmaceutically acceptable acid salts. The present compounds are useful as diuretics.

With the purpose of developing novel and useful diuretics, the present inventors have synthesized a number of novel derivatives of pyrimipyridazine and tested diuretic activities of those derivatives. In the course of their extensive study, they found out that, when a compound of the formula (II)

(wherein all the symbols have the meanings as defined above) is allowed to react with a Grignard reagent of the formula $$R^3MgX$$

III (wherein X is a halogen (e.g., chlorine, bromine or iodine) and $R^3$ has the meaning as defined above), reduction of the double bond between the 3- and 4-positions of the Compounds (II) occurs simultaneously with the introduction of the $R^3$ group into the 4-position, whereby the present Compounds (I) are obtained. They found further that a similar reaction is conducted by employing a compound of the formula $$R^3M$$

IV

[wherein M is an alkali metal (e.g. Na, K or Li) and $R^3$ has the meaning as defined above] in place of the Grignard reagent (III).

They found further that the present Compounds (I) produce a remarkably durable diuretic activity at a considerably low dose, which is attributable to the presence of a single bond between 3- and 4-positions of the present Compound (I). On the basis of those findings mentioned above, they completed the present invention.

Principal object of the present invention is to provide the Compounds (I) as well as their pharmaceutically acceptable acid salts.

Second object of the present invention is to provide a useful process for producing the Compound (I).

Another object of the present invention is to provide pharmaceutical compositions containing the Compound (I) as the main active ingredient.

The principal and the second objects are realized by reacting a Compound (II) with the Grignard reagent (III) or with a Compound (IV).

The starting Compound (II) was synthesized also by the present inventors and was known in e.g., the German (West) Pat. Application No. P 2046 577.4 which was filed in the name of Takeda Chemical Industries, Ltd. of Osaka, Japan and has been opened to public inspection since May 6, 1971.

Referring to the above formulas, the lower alkyl which may attach to the phenyl group denoted by $R^1$ may preferably be such ones as having 1 to 3 carbon atoms (e.g., methyl, ethyl, propyl).

The 5- or 6-membered heterocyclic imino group represented by $R^2$ may for example be morpholino, piperidino, piperazino, pyrrolidino and the like. Those heterocyclic groups may be substituted by lower alkyl groups as mentioned for $R^1$ group.

The alkyl designated by $R^3$ may be saturated or unsaturated and preferably such ones as having 1 to 7 carbon atoms (e.g., methyl, ethyl, propyl, iso-propyl, butyl, isobutyl, amyl, hexyl). Those alkyl groups may be substituted by pyridyl or lower alkoxy (e.g., methoxy, ethoxy, propoxy).

The cycloalkyl denoted by $R^3$ may for example be cyclopropyl, cyclopentyl or cyclohexyl. The aralkyl group denoted by $R^3$ may for example be benzyl or phenethyl. Those aralkyl groups may be substituted by lower alkyl (e.g., methyl, ethyl, propyl or iso-propyl) or lower alkoxy (e.g., methoxy, ethoxy, propoxy, iso-propoxy or methylenedioxy).

The phenyl group denoted by $R^3$ may be substituted by lower alkyl or lower alkoxy, examples of which are mentioned just above.

In the present process, the Compound (II) is reacted with the Grignard reagent (III) or the Compound (IV).

The present reaction is conducted generally in the presence of a suitable solvent at a temperature not exceeding about 100°C. The solvent employable in the present process may for example be ethers (e.g., methyl ether, ethyl ether, iso-propyl ether, amyl ether, dioxane or tetrahydrofuran), hydrocarbons (e.g. benzene, toluene or xylene) or tertiary amines (e.g., trimethyl amine, triethyl amine, pyridine, picoline, quinoline or isoquinoline).

The Compound (III) or (IV) is employed generally in an amount of about 2 to about 4 moles per mole of the Compound (II).

The reaction completes generally in a range from about half an hour to about 5 hours.

It is assumed that the present reaction proceeds through an intermediate compound of the formula (wherein Y means -MgX or M in which X and M have the meanings as defined above and the other symbols have the meanings as defined above).

It is further assumed that the Intermediate (V) can easily be converted to the Compound (I) upon hydrolysis with atmospheric moisture.

The Compound (I) can be isolated and purified by a per se conventional method such as extraction, crystallization, etc. The Compound (I) can be converted to its acid salt by a per se conventional procedure. As an acid which may form the salts with the Compound (I) there may be counted for example organic acid (e.g., acetic acid, fumaric acid, oxalic acid, malic acid or maleic acid) or inorganic acid (e.g., hydrochloric acid or sulfuric acid.).

The Compound (I) shows remarkable diuretic activity in animals including human and is useful as diuretics.

Pharmacological advantages found in the Compound (I) are, among others, as follows:

1. It can accelerate secretion of uine, while suppressing secretion of potassium ion in uine.
2. It can produce effective diuretic activity at a low dose.
3. The diuretic activity is considerably durable.
4. Side effects are very slight.

The present compounds can be administered orally or parenterally in the form of a suitable conventional pharmaceutical composition such as tablets, capsules, powder, granules, solution or suspension. The dosage may vary with kinds of host, type or severity of a disease to be treated, properties specific to various derivatives defined as Compound (I), etc. The dosage may for example be suitably selected from the range of about 10 to about 200 mg. per day for an adult human.

EXAMPLE 1

In 25 ml. of dry ether is suspended 0.48 g. of magnesium, to which is added a small amount of iodine. To the mixture is added dropwise a solution of 2.5 g. of benzyl chloride in 25 ml. of ether, whereby a Grignard reagent is prepared. A solution of 3.7 g. of 2-phenyl-5,8-dimorpholinopyrimido[4,5-d]pyridazine in 50 ml. of tetrahydrofuran is added to the mixture containing the Grignard reagent, and this reaction mixture is heated at 40°–50°C for an hour.

The resultant mixture is poured onto 300 ml. of ice-water and the mixture is shaken several times with 200 ml. of ethyl acetate. The ethyl acetate layer is separated, washed with water, dried and concentrated in vacuo. The residue of an oily substance is recrystallized from ethanol to give 2-phenyl-3,4-dihydro-4-benzyl-5,8-dimorpholino-pyrimido[4,5-d]pyridazine as yellow prisms melting at 222°–224°C. Yield 2.6 g. (55.4%)

Anal. Calc. for $C_{27}H_{30}N_6O_2$:
C, 68.91; H, 6.43; N, 17.86
Found C, 69.24; H, 6.49; N, 17.64

EXAMPLES 2–20

Following a similar procedure to that in Example 1, Examples 2–20 are carried out as summarized in the Table 1.

Table 1

| Example No. | Grignard reagent | | Starting compound (II) | | Reaction time (hour) | Compound (I) obtained | | | | | |
|---|---|---|---|---|---|---|---|---|---|---|---|
| | $R_3$ | X | $R_1$ | $R_2$ | | $R_1$ | $R_2$ | $R_3$ | Yield (%) | Melting point (°C) and appearance | Analysis or Identification |
| 2 | $CH_2$ | Br | | | 1 | | | $CH_2$- | 66 | 223 yellow prism | No depression in the mixed melting point with the compound (I) of Example 1 |
| 3 | $CH_2$- | Cl | | | 1 | | | $CH_2$- | 53.6 | 107-110 yellow prism | Calc. for $C_{29}H_{34}N_6O_2$: C 69.35, H 6.87, N 16.86 Found: C 69.77, H 6.95, N 16.6[illegible] |
| 4 | $CH_3$ | I | | | 0.5 | | | $CH_3$ | 56.5 | 275-277 yellow needle | Calc. for $C_{21}H_{26}N_6O_2$: C 63.94, H 6.64, N 21.31 Found: C 63.90, H 6.55, N 21.35 |
| 5 | $C_2H_5$ | Br | | | 0.5 | | | $C_2H_5$ | 42.5 | 159-161 yellow fine needle | Calc. for $C_{22}H_{28}N_6O_2$: C 64.68, H 6.91, N 20.5[illegible] Found: C 64.60, H 6.69, N 20.[illegible] |
| 6 | $C_4H_9$ | Br | | | 1 | | | $C_4H_9$ | 41.1 | 193-195 yellow prism | Calc. for $C_{24}H_{32}N_6O_2$: C 66.03, H 7.39, N 19.25 Found: C 66.21, H 7.20, N 19.23 |
| 7 | | Br | | | 1 | | | | 35.6 | 222-224 yellow needle | Calc. for $C_{26}H_{27}N_6O_2$: C 68.40, H 6.18, N 18.41 Found: C 68.31, H 6.05, N 18.10 |
| 8 | $CH_2$-$CH_3$ | Cl | | | 1 | | | $CH_2$-$CH_3$ | 48.5 | 225-227 yellow prism | Calc. for $C_{28}H_{32}N_6O_2$: C 69.40, H 6.66, N 17.34 Found: C 69.45, H 6.71, N 17.28 |
| 9 | $(CH_2)_2CH_3$ | Br | | | 0.5 | | | $(CH_2)_2CH_3$ | 47 | 228-230 yellow needle | Calc. for $C_{23}H_{30}O_2N_6$: C 65.38, H 7.16, N 19.89 Found: C 65.40, H 7.27, N 19.20 |
| 10 | $(CH_2)_5CH_3$ | Br | | | 0.5 | | | $(CH_2)_5CH_3$ | 34 | 173-176 yellow needle | Calc. for $C_{26}H_{36}O_2N_6$: C 67.21, H 7.81, N 18.09 Found: C 67.27, H [illegible], N 17.94 |
| 11 | $CH(CH_3)CH_3$ | Br | | | 0.5 | | | $CH(CH_3)CH_3$ | 33 | 132-136 yellow needle | Calc. for $C_{23}H_{30}O_2N_6$: C 65.38, H 7.15, N 19.89 Found: C 65.59, H 7.16, N 20.[illegible] |

Table I – Continued

| | | | | | | | | | | | |
|---|---|---|---|---|---|---|---|---|---|---|---|
| 12 | $CH_2CH(CH_3)_2$ | Br | | | 0.5 | | | $CH_2CH(CH_3)_2$ | 55 | 297-302 yellow needle | Calc. for $C_{24}H_{32}O_2N_5$: C 66.03, H 7.39, N 19.25 Found: C 66.07, H 7.23, N 19.20 |
| 13 | $(CH_2)_2CH(CH_3)_2$ | Br | | | 0.5 | | | $(CH_2)_2CH(CH_3)_2$ | 49 | 206-208 yellow needle | Calc. for $C_{25}H_{34}O_2N_6$: C 66.64, H 7.16, N 18.65 Found: C 66.77, H 7.6[illegible], N 18.[illegible] |
| 14 | $C(CH_3)_3$ | Br | | | 1 | | | $C(CH_3)_3$ | 78 | 297(decomp.) yellow needle | Calc. for $C_{24}H_{32}O_2N_5$: C 66.03, H 7.39, N 19.25 Found: C 66.30, H 7.39, N 19.02 |
| 15 | | Cl | | | 1 | | | | 52 | 251-254 yellow prism | Calc. for $C_{26}H_{34}O_2N_6$: C 67.50, H 7.41, N 18.17 Found: C 67.40, H 7.22, N 18.03 |
| 16 | | Cl | | | 1 | | | | 43 | 208-211 yellow prism | Calc. for $C_{28}H_{32}O_2N_6 \cdot \frac{1}{2}CH_3COOC_2H_5$: C 68.03, H 7.04, N 15.57 Found: C 67.60, H 6.89, N [illegible] |
| 17 | | Cl | | | 1 | | | | 48 | 159-163 yellow prism | Calc. for $C_{28}H_{32}O_3N_6$: C 67.18, H 6.44, N 16.79 Found: C 67.39, H 6.37, N 16.14 |
| 18 | | Cl | | | 1 | | | | 41 | 222-224 yellow prism | Calc. for $C_{26}H_{28}O_2N_6$: C 68.40, H 6.18, N 18.71 Found: C 68.24, H 6.21, N [illegible] |
| 19 | | Cl | | | 1 | | | | 63 | 232-234 yellow prism | Calc. for $C_{29}H_{34}N_6$: C 74.64, H 7.34, N 18.01 Found: C 74.67, H 7.28, N 17.[illegible] |
| 20 | | Cl | | | 1 | | | | 23 | 217-220 yellow prism | Calc. for $C_{30}H_{43}O_3N_6$: C 69.40, H 6.60, N 17.34 Found: C 69.25, H 6.66, N 17.[illegible] |

Remarks: In all of the Examples listed above, the reaction is carried out at 40-50°C in tetrahydrofuran.

Example 21

To a suspension of 100 mg. of magnesium and 370 mg. of triethylamine in 2 ml. of dry benzene is added gradually and dropwise a solution of 380 mg. of ethyl bromide in 10 ml. of dry benzene, whereby a Grignard reagent is prepared. A solution of 680 mg. of 2-phenyl-5,8-dimorpholinopyrimido[4,5-d]pyridazine in 15 ml. of chloroform is added to the Grignard reagent and the mixture is heated at 40°-50°C for 1 hour. The resulting mixture is poured onto 100 ml. of ice-water and the mixture is shaken several times with ethyl acetate. The organic layer is separated, washed with water, dried and concentrated under reduced pressure. The residue of an oily substance is columnchromatographed on silica-gel with a mixture of acetone and benzene (1:4 by volume).

The eluate is concentrated under reduced pressure and the residue is recrystallized from ethanol to give 2-phenyl-3,4-dihydro-4-ethyl-5,8-dimorpholinopyrimido[4,5-d]pyridazine as yellow prisms melting at 159°-161°C. The crystals show no depression of the melting point when mixed with the product obtained in the Example 5.

Example 22

Following a similar procedure to that in Example 21, Example 22 is carried out as summarized in the Table 2.

Table 2

| Example No. | Grignard reagent | | Starting compound (II) | | Compound (I) obtained | | | | | |
|---|---|---|---|---|---|---|---|---|---|---|
| | $R_3$ | X | $R_1$ | $R_2$ | $R_1$ | $R_2$ | $R_3$ | Yield (%) | Melting point (°C) and appearance | Analysis |
| 22 | $CH_2=CH-CH_2$ | Br | | | | | $CH_2=CH-CH_2$ | 9.5 | 218-222 yellow prism | Calc. for [illegible]: C 65.69, H 6.7[illegible], N 19.99 Found: C 65.7[illegible], H 6.73, N 19.99 |

Remark: In the Example listed above, the reaction is carried out at 40-50°C for an hour in tetrahydrofuran.

Example 23

A solution of 3.8 g. of 2-phenyl-5,7-dimorpholinopyrimido[4,5-d]pyridazine in 50 ml. of tetrahydrofuran is added to a solution of butyl lithium in 50 ml. of ether, which is prepared from 0.86 g. of lithium and 6.85 g. of butyl bromide at −10°C in the streams of nitrogen. The reaction mixture is stirred at room temperature for an hour and poured into 500 ml. of water. The separated oil is extracted with ethyl acetate. The extract is dried over anhydrous sodium sulfate. After evaporation of the solvent in vacuo, the residue is purified by column chromatography on silica-gel with a mixture of benzene and acetone (4:1 by volume) to afford 2-phenyl-3,4-dihydro-4-butyl-5,7-dimorpholinopyrimido[4,5-d]pyridazine as yellow prisms melting at 193°–195°C. Yield: 1.7 g. (39%).

Examples 24 –27

Following the procedure of Example 23, these Examples are carried out as summarized in the Table 3.

4. A compound according to claim 1, wherein the compound is 2-phenyl-3,4-dihydro-4-methyl-5,8-dimorpholinopyrimido-[4,5-d]pyridazine.

5. A compound according to claim 1, wherein the compound is 2-phenyl-3,4-dihydro-4-ethyl-5,8-dimorpholinopyrimido[4,5-d]pyridazine.

6. A compound according to claim 1, wherein the compound is 2-phenyl-3,4-dihydro-4-butyl-5,8-dimorpholinopyrimido-[4,5-d]pyridazine.

7. A compound according to claim 1, wherein the compound is 2-phenyl-3,4-dihydro-4-phenyl-5,8-dimorpholinopyrimido-[4,5-d]pyridazine.

8. A compound according to claim 1, wherein the compound is 2-phenyl-3,4-dihydro-4-(4-methylbenzyl)-5,8-dimorpholino-pyrimido[4,5-d]pyridazine.

9. A compound according to claim 1, wherein the compound is 2-phenyl-3,4-dihydro-4-allyl-5,8-dimorpholinopyrimido[4,5-d]pyridazine.

10. A compound according to claim 1, wherein the compound is 2-phenyl-3,4-dihydro-4-propyl-5,8-dimorpholinopyrimido-[4,5-d]pyridazine.

Table 3

| Example No. | Starting compound (IV) | | Starting compound (II) | | Compound (I) obtained | | | | | |
|---|---|---|---|---|---|---|---|---|---|---|
| | $R^3$ | M | $R^1$ | $R^2$ | $R^1$ | $R^2$ | $R^3$ | Yield (%) | Melting point (°C) | Analysis or Identification |
| 24 |  | Li |  |  |  |  |  | 64 | 222-224 yellow needle | No depression [illegible] in the [illegible] point [illegible] compound [illegible] Example [illegible] |
| 25 | $CH_2$-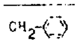 | Li |  | 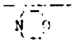 |  | 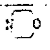 | $CH_2$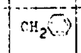 | 85 | 223 yellow prism | No depression [illegible] in the [illegible] point [illegible] compound (I) of Example 2 |
| 26 | $CH_2$-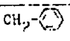 | Na |  | 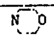 |  | 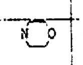 | $CH_2$ | 8 | 223 yellow prism | No depression [illegible] in the [illegible] point [illegible] compound (I) of Example 2. |
| 27 | $CH_2$-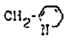 | Li |  | 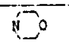 |  |  | $CH_2$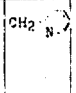 | 55 | 195-196 yellow needle | Calc. for [illegible]: C 66.22, H 6.19, N 20.79 Found: C [illegible], H 6.07, N [illegible] |

What we claim is:

1. A compound of the formula

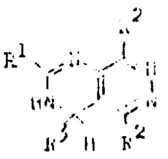

wherein $R^1$ is phenyl or methylphenyl; $R^2$ is morpholino, methylmorpholino, or piperidino, and $R^3$ is alkyl of 1 to 7 carbon atoms, allyl, benzyl, methylbenzyl, methoxybenzyl, 3-4 methylenedioxy-benzyl, phenethyl, phenyl or cyclohexyl.

2. A compound according to claim 1, wherein the compound is 2-phenyl-3,4-dihydro-4-benzyl-5,8-dimorpholinopyrimido-[4,5-d]pyridazine.

3. A compound according to claim 1, wherein the compound is 2-phenyl-3,4-dihydro-4-benzyl-5,8-bis(2-methylmorpholino)pyrimido[4,5-d]-pyridazine.

11. A compound according to claim 1, wherein the compound is 2-phenyl-3,4-dihydro-4-hexyl-5,8-dimorpholinopyrimido-[4,5-d]pyridazine.

12. A compound according to claim 1, wherein the compound is 2-phenyl-3,4-dihydro-4-iso-propyl-5,8-dimorpholinopyrimido-[4,5-d]pyridazine.

13. A compound according to claim 1, wherein the compound is 2-phenyl-3,4-dihydro-4-iso-butyl-5,8-dimorpholinopyrimido-[4,5-d]pyridazine.

14. A compound according to claim 1, wherein the compound is 2-phenyl-3,4-dihydro-4-iso-amyl-5,8-dimorpholinopyrimido-[4,5-d]pyridazine.

15. A compound according to claim 1, wherein the compound is 2-phenyl-3,4-dihydro-4-t-butyl-5,8-dimorpholinopyrimido-[4,5-d]pyridazine.

16. A compound according to claim 1, wherein the compound is 2-phenyl-3,4-dihydro-4-cyclohexyl-5,8-dimorpholinopyrimido-[4,5-d]pyridazine.

17. A compound according to claim 1, wherein the compound is 2-phenyl-3,4-dihydro-4-phenethyl-5,8-dimorpholinopyrimido-[4,5-d]pyridazine.

18. A compound according to claim 1, wherein the compound is 2-phenyl-3,4-dihydro-4-(4-methoxybenzyl)-5,8-dimorpholino-pyrimido[4,5-d]pyridazine.

19. A compound according to claim 1, wherein the compound is 2-phenyl-3,4-dihydro-4-(3,4-methylenedioxybenzyl)-5,8-dimorpholinopyrimido[4,5-d]pyridazine.

20. A compound according to claim 1, wherein the compound is 2-phenyl-3,4-dihydro-4-benzyl-5,8-dipiperidinopyrimido-[4,5-d]pyridazine.

21. A compound according to claim 1, wherein the compound is 2-(3-tolyl)-3,4-dihydro-4-benzyl-5,8-dimorpholinopyrimido-[4,5-d]pyridazine.

22. The compound as claimed in claim 1, wherein $R^1$ is phenyl.

23. The compound as claimed in claim 1, wherein $R^2$ is morpholino.

24. The compound as claimed in claim 1, wherein $R^3$ is benzyl.

25. The compound as in claim 1 wherein $R^2$ is methylmorpholino.

26. The compound as in claim 1 wherein $R^2$ is piperidino.

27. A process for producing a compound of the formula

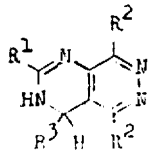

wherein $R^1$ is phenyl or methylphenyl; $R^2$ is morpholino, methylmorpholino, or piperidino, and $R^3$ is alkyl of 1 to 7 carbon atoms, allyl, benzyl, methylbenzyl, methoxybenzyl, 3,4 methylenedioxy-benzyl, phenethyl, phenyl or cyclohexyl which comprises the step of reacting a compound of the formula

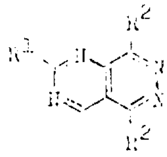

wherein all the symbols have the meanings as defined above with a Grignard reagent of the formula $$R^3MgX$$

wherein $X$ is halogen and $R^3$ has the meaning as defined above or with a compound of the formula $$R^3M$$

wherein $M$ is alkali metal and $R^3$ has the meaning as defined above.

* * * * *